J. H. BEAM.
Sausage-Machine.
No. 164,416.
Patented June 15, 1875.
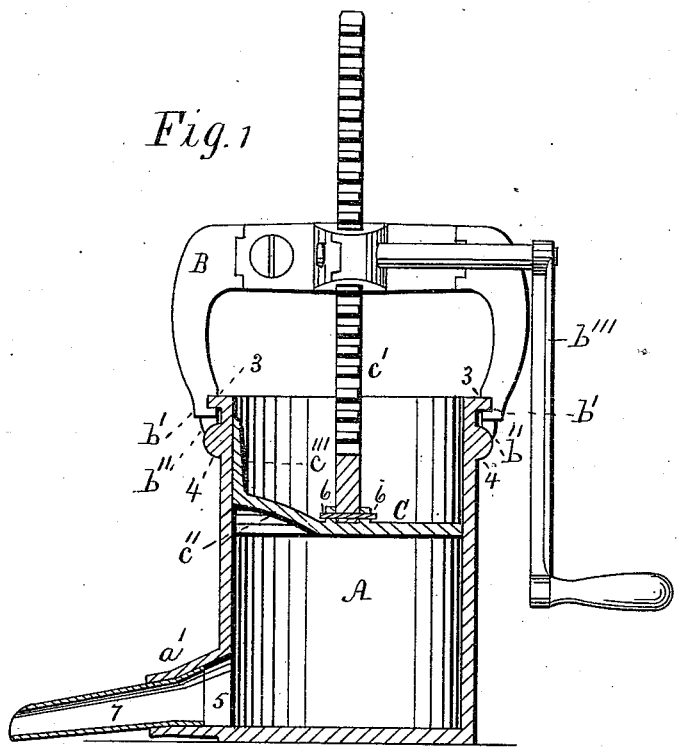
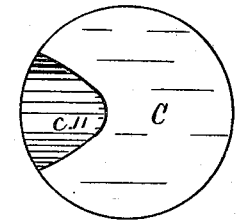
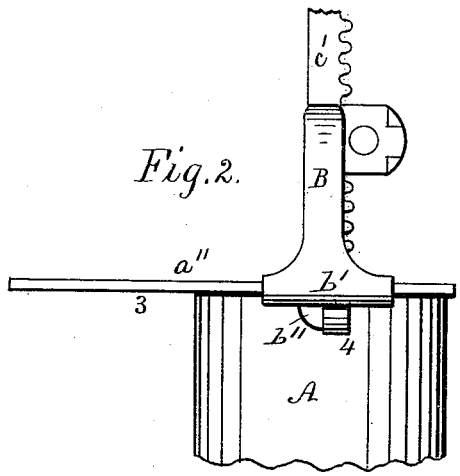
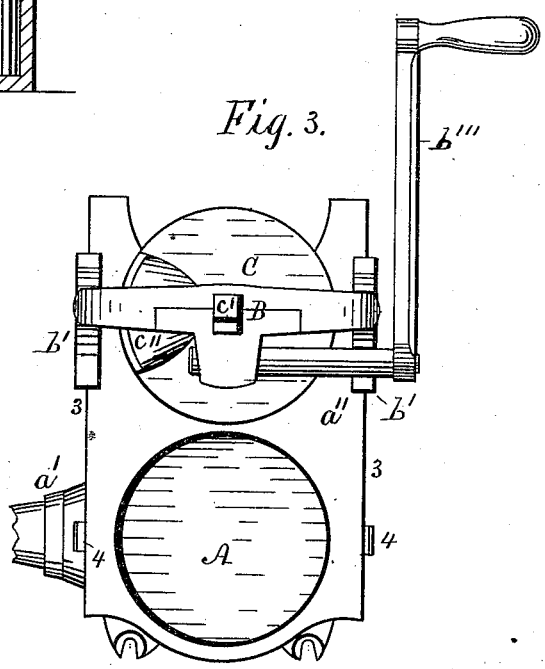
Witnesses:
Benj Morison
Wm H. Morison
Inventor:
Jacob H. Beam

UNITED STATES PATENT OFFICE.

JACOB H. BEAM, OF PHILADELPHIA, PENNSYLVANIA.

IMPROVEMENT IN SAUSAGE-MACHINES.

Specification forming part of Letters Patent No. 164,416, dated June 15, 1875; application filed June 3, 1875.

*To all whom it may concern:*

Be it known that I, JACOB H. BEAM, of the city of Philadelphia, in the State of Pennsylvania, have invented an Improvement in Sausage Stuffers or Fillers, of which the following is a specification:

My invention relates more especially to the lard-press and sausage-stuffer of Joseph B. Cassel's patent, No. 81,751, dated September 1, 1868; and the object of my said invention is to render the said machine more simple, inexpensive, and effective as a sausage-stuffer, by dispensing with the perforated casing and funnel-shaped ring, and providing a fixed platform and sliding yoke for adjusting the different positions of the plunger, and also a recess in the under side of the plunger-disk, for the purpose of allowing the last portion of the meat on the bottom of the containing-vessel to be forced out toward the spout, and thus clear the said bottom at every completed downward movement of said plunger, all of which will be fully and clearly described, and set forth herein, with reference to the accompanying drawing, in which—

Figure 1 is a vertical central section of the meat-receiving vessel and the plunger, in connection with a front elevation of the sliding yoke and its rack and crank. Fig. 2 is a sectional side elevation of Fig. 1. Fig. 3 is a plan view of the whole machine, showing the receiver opened for the reception of the sausage-meat; and Fig. 4 is a plan view of the under or recessed side of the plunger.

The receiving-vessel A is simply a hollow cylindrical vessel of cast-iron, provided with a projecting spout, $a'$, on a line with the inside surface of the bottom of the vessel and open upper end, from which projects horizontally a flat platform, $a''$, the two opposite side edges 3 3 of which are parallel to each other, and each projects about three-eighths of an inch over the outer side of the vessel A, while the rear portion of said platform extends backward in the same horizontal plane about four inches, as represented in Figs. 2 and 3.

The yoke B, which carries the plunger C, with its rack $c'$ and connecting pinion (not seen) and cranked handle $b'''$, has a grooved foot, $b'$, at each end, and in these grooves the two respective side edges 3 3 of the platform $a''$ fit accurately, yet so as to allow the rigid yoke B to be slid backward and forward on the platform $a''$ when the plunger C is elevated, sufficiently for the purpose, above the mouth of the vessel A, as shown in Fig. 3, in which the plunger C is shown as moved backward, so as to leave the mouth of the vessel A fully open for the introduction of the meat into the same, and in Figs. 1 and 2, in which the plunger is shown as inserted and suspended within the vessel A. (See Fig. 1.)

Directly below the projecting sides 3 3 of the platform $a''$, two respective bosses, 4 4, are cast on the outside of the vessel A, and on the under side of each foot $b'$ of B a corresponding ring-boss, $b''$, is cast, which abuts against the respective boss 4 of A, and thus stops the forward movement of the sliding yoke B, when the center of the plunger C corresponds with the center of the mouth of A. (See Figs. 1 and 2.)

The under side of the plunger C has a recess, $c''$, or cavity, which extends nearly to the center of the under side of the said plunger, and widens gradually therefrom until it reaches the spout-hole 5, (see Fig. 1,) where it joins a vertical flange, $c'''$, that slides up and down with the plunger C, and, when down to its lowest position in the vessel A, covers or closes the upper half of the spout-hole 5, and leaves the lower half of the latter in open communication with the recess $c''$, so that any of the meat which is compressed into a thin stratum upon the bottom of A may be, by continuing the pressure on the plunger C, forced out into the cavity or toward the exit-spout $a'$, and thus clear the bottom of A ready for a fresh supply of meat. The plunger C has two lugs, $b\ b$, in the middle of its upper side, between which the lower end of the rack $c'$ fits, and is secured by a removable cross-pin.

The pinion on the crank-shaft gears into the rack, and is inclosed in a removable portion of the yoke, in the usual manner, and is therefore not seen in the drawing.

The operation of my improved sausage-filler is as follows: The plunger C being raised by operating the crank $b'''$ to a position a little above the mouth of the vessel A, and then pushed backward from over said mouth, by pushing backward the sliding yoke B, full and free access to the mouth of A is thus given for the filling-in of the sausage-meat even with the top of the vessel. The yoke B is then slid forward until checked by the bosses $b''$ and 4, and thus the plunger C brought into juxtaposition with the mouth of A. The sausage-skin having been slipped onto the adjustable portion 7 of the spout $a'$, motion is now given to the crank, and thus the plunger C forced downward, until it is stopped by coming into direct contact with the inside of the bottom of A, and consequently the contents or meat discharged into the retreating skin through the spout-hole 5, excepting only the small portion which remains in the recess $c''$. The motion of the crank $b'''$ is now reversed, and thus the plunger C withdrawn from A, and afterward, by hand, pushed back into its first position. (Shown in Fig. 3.)

It will be understood, without any further description, that the sliding movement given to the yoke, which is in connection with the platform, affords better facility for filling and operating the machine than a hinged yoke, and that it is more simple, durable, and effective for the purpose, and more easily cleaned; and that the recess in the under side of the plunger enables the operator to displace all the meat from the bottom of the vessel.

I claim as my invention—

1. The combination, in a sausage-filling machine, substantially as described, of the sliding yoke B and platform $a''$ with the meat-receiving vessel A, as and for the purpose hereinbefore set forth.

2. The recess $c''$ in the under side of the plunger C, in combination with the vertical flange $c'''$, substantially as and for the purpose hereinbefore set forth and described.

JACOB H. BEAM.

Witnesses:
BENJ. MORISON,
WM. H. MORISON.